(12) United States Patent
Doi (10) Patent No.: US 9,709,743 B2
(45) Date of Patent: Jul. 18, 2017

(54) OPTICAL MODULATOR

(71) Applicant: Fujitsu Optical Components Limited, Kawasaki-shi, Kanagawa (JP)

(72) Inventor: Masaharu Doi, Sapporo (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/221,047

(22) Filed: Jul. 27, 2016

(65) Prior Publication Data

US 2017/0045688 A1    Feb. 16, 2017

(30) Foreign Application Priority Data

Aug. 12, 2015 (JP) ................................. 2015-159521

(51) Int. Cl.

| G02F 1/035 | (2006.01) |
|---|---|
| G02B 6/27 | (2006.01) |
| G02B 6/34 | (2006.01) |
| G02F 1/225 | (2006.01) |
| G02F 1/21 | (2006.01) |

(52) U.S. Cl.
CPC ......... *G02B 6/2773* (2013.01); *G02B 6/2706* (2013.01); *G02B 6/2766* (2013.01); *G02B 6/34* (2013.01); *G02F 1/225* (2013.01); *G02F 2001/212* (2013.01)

(58) Field of Classification Search
CPC .................. G02F 1/2255; G02F 1/0356; G02F 2001/212; G02F 2202/07; G02F 2202/20
USPC .................................................. 385/2, 31–45
See application file for complete search history.

(56) References Cited

U.S. PATENT DOCUMENTS

| 4,641,926 | A | 2/1987 | Shirasaki | |
|---|---|---|---|---|
| 9,316,887 | B2 * | 4/2016 | Sugiyama | ............. G02F 1/2255 |
| 9,473,245 | B2 * | 10/2016 | Yamaji | ................. G02B 6/4213 |

(Continued)

FOREIGN PATENT DOCUMENTS

| JP | 59-201026 | 11/1984 |
|---|---|---|
| JP | 63-183402 | 7/1988 |

(Continued)

OTHER PUBLICATIONS

Office Action, dated Apr. 27, 2015, in Japanese Application No. JP2015-159521 (5 pp.).

*Primary Examiner* — Ellen Kim
(74) *Attorney, Agent, or Firm* — Staas & Halsey LLP (57) ABSTRACT

An optical modulator includes a modulating unit, an optical fiber, and a combining unit. The modulating unit outputs first and second optical beams with the electric signal superimposed thereon in a first direction. The optical fiber is placed along a second direction perpendicular to the first direction. The combining unit combines the first and second optical beams output by the modulating unit and outputs an optical beam obtained by the first and second optical beams being combined to the optical fiber. The combining unit includes a polarized light rotating element and a polarized light combining element. The polarized light rotating element rotates the polarization direction of the first optical beam. The polarized light combining element reflects the first optical beam of which the polarization direction has been rotated and the second optical beam in the second direction, and combines the first and second optical beams reflected in the second direction.

4 Claims, 7 Drawing Sheets

(56) References Cited

U.S. PATENT DOCUMENTS

| | | | | |
|---|---|---|---|---|
| 2003/0228081 A1* | 12/2003 | Tavlykaev | ............ | G02F 1/0316 |
| | | | | 385/3 |
| 2005/0213471 A1 | 9/2005 | Taguchi et al. | | |
| 2009/0041403 A1* | 2/2009 | Kawano | ................ | G02F 1/0121 |
| | | | | 385/3 |
| 2015/0078761 A1 | 3/2015 | Yamaji et al. | | |
| 2015/0253582 A1* | 9/2015 | Sasaki | .................. | G02B 27/283 |
| | | | | 359/246 |

FOREIGN PATENT DOCUMENTS

| | | |
|---|---|---|
| JP | 64-006906 | 1/1989 |
| JP | 5-5817 | 1/1993 |
| JP | 2005-099459 | 4/2005 |
| JP | 2005-326823 | 11/2005 |
| WO | WO2014/051096 | 4/2014 |

\* cited by examiner

OPTICAL MODULATOR

CROSS-REFERENCE TO RELATED APPLICATION

This application is based upon and claims the benefit of priority of the prior Japanese Patent Application No. 2015-159521, filed on Aug. 12, 2015, the entire contents of which are incorporated herein by reference.

FIELD

The embodiments discussed herein are related to an optical modulator.

BACKGROUND

Generally, in optical transmission systems, there may be employed an optical modulator that performs optical modulation using, for example, a Mach-Zehnder interferometer formed on a substrate (an optical modulator chip). In optical modulators using a Mach-Zehnder interferometer, an optical beam input to an optical modulator is split into two light, and an electric signal is superimposed on each of the light. These two light with the electric signal superimposed thereon are modulated into one light within an optical modulator chip, and the modulated light is output to the outside. As the optical modulator chip, for example, a lithium niobate (LiNbO$_3$) substrate is used.

In recent years, a polarization multiplexing modulation method may be used for the purpose of speeding up the optical signal transmission. In the case of this modulation method, one light input is split into two light within an optical modulator chip, and modulation is performed on each of light. That is, two optical modulating units are formed on one optical modulator chip (one substrate). The two modulated light are output from the optical modulator chip to the outside, and after that, they are combined into one optical beam, and the combined optical beam is output to an optical fiber placed along a direction of the long side of the optical modulator chip.

A polarized-light combiner including a polarized light rotating element and a polarized light combining element may be used to combine two optical beams. The polarized-light combiner rotates the polarization direction of one of the two optical beams running in parallel by means of the polarized light rotating element such as a half-wave plate, and synthesizes the two optical beams of which the polarization directions are perpendicular to each other into one optical beam by means of the polarized light combining element such as a polarization beam combiner (PBC) prism.

[Patent Literature 1] Japanese Laid-open Patent Publication No. 63-183402

In a case where the above-described polarized-light combiner is applied to an optical modulator, the polarized-light combiner combines two optical beams output from an optical modulator chip into one optical beam, and outputs the obtained one optical beam to an optical fiber placed along the direction of the long side of a substrate. This demands a space for the placement of the polarized-light combiner and the optical fiber along the direction of the long side of the substrate, thereby it becomes difficult to achieve sufficient miniaturization of an optical modulator.

Figure 7:
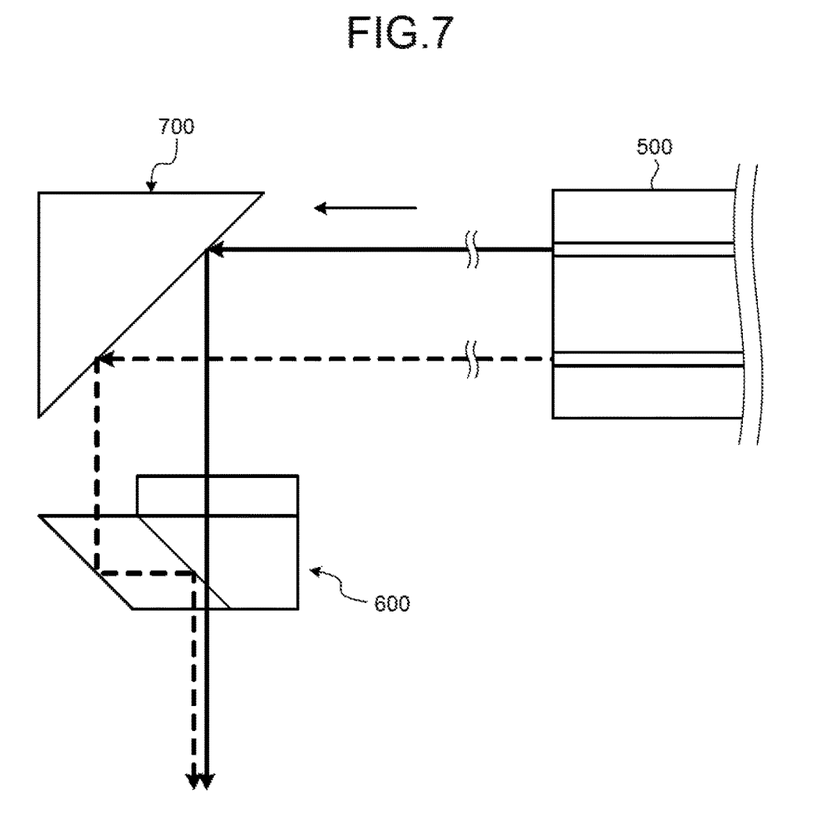
FIG. 7 is a diagram illustrating an example of a positional relation among an optical modulator chip, a polarized-light combiner, and a mirror.

In contrast, there is considered a structure in which an optical fiber is placed along a direction of the short side of a substrate. In this structure, for example, as illustrated in FIG. 7, a mirror 700 is placed between an optical modulator chip 500 and a polarized-light combiner 600; two optical beams output from the optical modulator chip 500 are reflected in the direction of the short side of the substrate by the mirror 700 and then input to the polarized-light combiner 600. Then, the polarized-light combiner 600 synthesizes the two optical beams reflected in the direction of the short side of the substrate by the mirror 700 into one optical beam, and outputs the obtained one optical beam to the optical fiber placed along the direction of the short side of the substrate.

However, when a mirror, which is a separate part from a polarized-light combiner, is placed between an optical modulator chip and the polarized-light combiner, the number of parts increases, and the miniaturization of an optical modulator is inhibited. If the miniaturization of an optical modulator is inhibited, it becomes difficult to house the optical modulator in another device, such as an optical transponder; therefore, there are demands for promoting the miniaturization of an optical modulator.

SUMMARY

According to an aspect of an embodiment, an optical modulator includes a modulating unit that superimposes an electric signal on light, and outputs first and second optical beams with the electric signal superimposed thereon in a first direction; an optical fiber that is placed along a second direction perpendicular to the first direction; and a combining unit that combines the first and second optical beams output by the modulating unit and outputs an optical beam obtained by the first and second optical beams being combined to the optical fiber, wherein the combining unit includes: a polarized light rotating element that rotates a polarization direction of the first optical beam; and a polarized light combining element that reflects the first optical beam of which the polarization direction has been rotated by the polarized light rotating element and the second optical beam in the second direction, and combines the first and second optical beams reflected in the second direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Incidentally, the optical modulator discussed herein is not limited by the embodiments described below.

[a] First Embodiment

Figure 1:
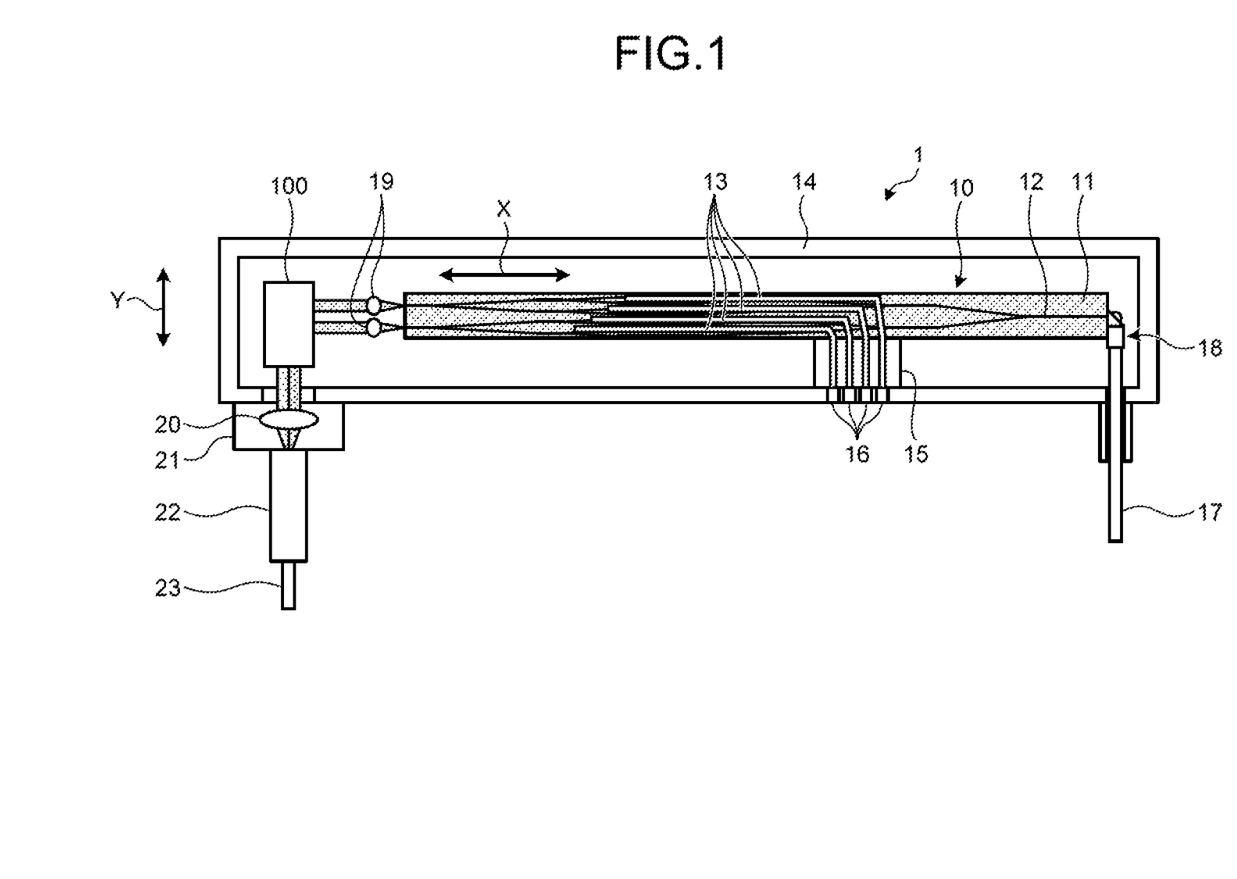
FIG. 1 is a top view illustrating a configuration of an optical modulator according to a first embodiment.

FIG. 1 is a top view illustrating a configuration of an optical modulator according to a first embodiment. As illustrated in FIG. 1, an optical modulator 1 includes an optical modulator chip 10. The optical modulator chip 10 is formed by installing electrodes 13 near an optical waveguide 12 formed on a substrate 11. The substrate 11 is formed of lithium niobate ($LiNbO_3$), and is also called an LN substrate. The optical waveguide 12 is formed by forming and thermally diffusing a metal pattern, such as a Ti pattern, or by proton exchange in benzoic acid after patterning. The optical waveguide 12 forms a Mach-Zehnder interferometer, and the electrodes 13 are installed on the waveguide.

The electrodes 13 apply the refractive-index change due to an electric field in z-axis direction, and therefore are set up just above the optical waveguide 12. The electrodes 13 are, for example, coplanar electrodes formed by patterning signal electrodes and earth electrodes on the optical waveguide 12. The optical modulator chip 10 has a buffer layer between the substrate 11 and the electrodes 13 in order to prevent light propagating through the optical waveguide 12 from being absorbed by the signal electrodes and the earth electrodes. The buffer layer is formed of, for example, $SiO_2$ or the like.

In the optical modulator 1, connectors 16 are installed in a package 14 through a relay board 15; the package 14 houses parts such as the optical modulator chip 10. The connectors 16 cause an electric signal for modulated light propagating through the optical waveguide 12 to the electrodes 13.

Furthermore, in the optical modulator 1, as illustrated in FIG. 1, an optical fiber 17 and a ferrule 18 are placed on the preceding-stage side of the optical modulator chip 10. The optical fiber 17 is placed along the direction of the short side of the substrate 11, and transmits light from a light source to the ferrule 18. The ferrule 18 reflects the light input from the optical fiber 17 in a direction of the long side of the substrate 11, and concentrates the reflected light and inputs an obtained optical beam to the optical modulator chip 10. Incidentally, hereinafter, the direction of the long side of the substrate 11 is referred to as "direction X", and the direction of the short side of the substrate 11 is referred to as "direction Y". The direction X is an example of a first direction, and the direction Y is an example of a second direction that is perpendicular to the first direction.

The optical modulator chip 10 splits an optical beam input from the ferrule 18 into two by means of the optical waveguide 12, and superimposes an electric signal on each of the optical beams by means of the electrodes 13. Then, the optical modulator chip 10 outputs the two optical beams with the electric signal superimposed thereon in the direction of the long side of the substrate 11, i.e., in the direction X.

Moreover, in the optical modulator 1, as illustrated in FIG. 1, a collimate lens 19, a polarized-light combiner 100, a condenser lens 20, a lens holder 21, a ferrule 22, and an optical fiber 23 are placed on the subsequent-stage side of the optical modulator chip 10. Incidentally, the collimate lens 19 and the polarized-light combiner 100 are housed in the package 14, and the condenser lens 20, the lens holder 21, the ferrule 22, and the optical fiber 23 are placed outside of the package 14.

The collimate lens 19 collimates optical beams with an electric signal superimposed thereon by the optical modulator chip 10, and then outputs the collimated optical beams to the polarized-light combiner 100. That is, the collimate lens 19 collimates two optical beams running in parallel, outputs the collimated optical beams to the polarized-light combiner 100. The polarization directions of the two optical beams outputs output from the collimate lens 19 are the same.

The polarized-light combiner 100 combines the two optical beams output from the collimate lens 19 into one optical beam, and outputs the combined optical beam including two polarized lights of which the polarization directions are perpendicular to each other to the optical fiber 23 through the condenser lens 20. That is, the polarized-light combiner 100 rotates the polarization direction of one of the optical beams output from the collimate lens 19 and then synthesizes the optical beam with the other optical beam, and outputs the obtained one optical beam to the optical fiber 23. In the present embodiment, the one polarized-light combiner 100 can double as a function of combining two optical beams of which the polarization directions are perpendicular to each other and a function of outputting the combined optical beam to an optical fiber placed along the direction of the short side of a substrate. Consequently, as compared with a structure in which a mirror, which is a separate member from the polarized-light combiner 100, is placed between the optical modulator chip 10 and the polarized-light combiner 100, the number of parts can be reduced, and the miniaturization of the optical modulator 1 can be promoted. The polarized-light combiner 100 is an example of a combining unit. A specific configuration of the polarized-light combiner 100 will be described later.

The condenser lens 20 condenses the one optical beam output from the polarized-light combiner 100 into the optical fiber 23. The lens holder 21 secures the condenser lens 20 to the package 14. The ferrule 22 secures the optical fiber 23 to the lens holder 21.

The optical fiber 23 is placed along the direction of the short side of the substrate 11, i.e., the direction Y, and transmits a signal light obtained by the condenser lens 20 condensing the optical beam to a subsequent-stage-side device.

Figure 2:
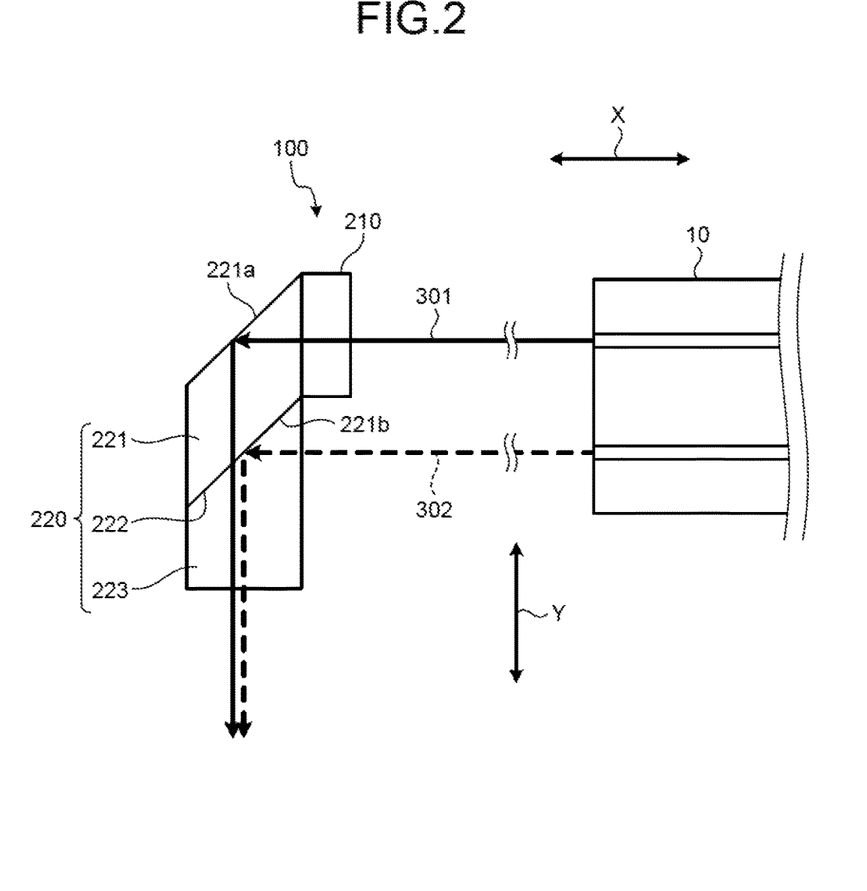
FIG. 2 is a top view illustrating a configuration of a polarized-light combiner according to the first embodiment.

Subsequently, a configuration of the polarized-light combiner 100 illustrated in FIG. 1 is explained with reference to FIG. 2. FIG. 2 is a top view illustrating a configuration of a polarized-light combiner according to the first embodiment. As illustrated in FIG. 2, the polarized-light combiner 100 includes a wave plate 210 and a PBC prism 220.

The wave plate 210 is a half-wave plate that is formed of, for example, crystal, and rotates the polarization direction of one of optical beams output from the optical modulator chip 10 by 90 degrees. That is, the wave plate 210 serves as a polarized light rotating element that rotates the polarization direction of one of two optical beams output from the optical modulator chip 10.

The PBC prism 220 is formed of, for example, quartz glass, and reflects two optical beams output in the direction X from the optical modulator chip 10 in the direction Y and synthesizes the two optical beams reflected in the direction Y into one optical beam. Specifically, the PBC prism 220 synthesizes two optical beams 301 and 302 by reflecting the incident optical beam 301, which has passed through the wave plate 210, by the surface thereof so as to let the optical beam 301 run straight in the direction Y and reflecting the incident optical beam 302, which does not pass through the wave plate 210, by the inside thereof so as to let the optical beam 302 run straight in the direction Y. That is, the PBC prism 220 serves as a polarized-light combining element that combines two optical beams output in the direction X from the optical modulator chip 10 and outputs the combined optical beam in the direction Y.

The PBC prism 220 includes a first prism 221 and a second prism 223. The first prism 221 has inclined surfaces 221a and 221b that are inclined with respect to the direction X; the wave plate 210 is fixed to the first prism 221. The second prism 223 is bonded to the inclined surface 221b of the first prism 221 through a polarized-light separating film 222. The polarized-light separating film 222 is formed of, for example, a dielectric multilayer, and reflects an optical beam in a predetermined polarization direction and lets through an optical beam of which the polarization direction is perpendicular to the optical beam to be reflected.

In such a configuration, of the two optical beams output from the optical modulator chip 10, the optical beam 301 passes through the wave plate 210 and then enters the PBC prism 220; the optical beam 302 directly enters the PBC prism 220 without passing through the wave plate 210. Then, the optical beam 301 having passed through the wave plate 210 is reflected in the direction Y by the inclined surface 221a of the first prism 221. Here, the polarization direction of the optical beam 301 is rotated by 90 degrees by the wave plate 210, so at the time when the optical beam 301 enters the PBC prism 220, the polarization direction of the optical beam 301 is perpendicular to that of the optical beam 302. Therefore, after the optical beam 301 is reflected in the direction Y by the inclined surface 221a of the first prism 221, the optical beam 301 runs through the polarized-light separating film 222; on the other hand, after the optical beam 302 is reflected in the direction Y by the polarized-light separating film 222, the optical beam 302 is combined with the optical beam 301 having run through the polarized-light separating film 222. As a result, one optical beam obtained by combining the optical beams 301 and 302 of which the polarization directions are perpendicular to each other is output to the optical fiber 23 through the condenser lens 20.

Figure 3:
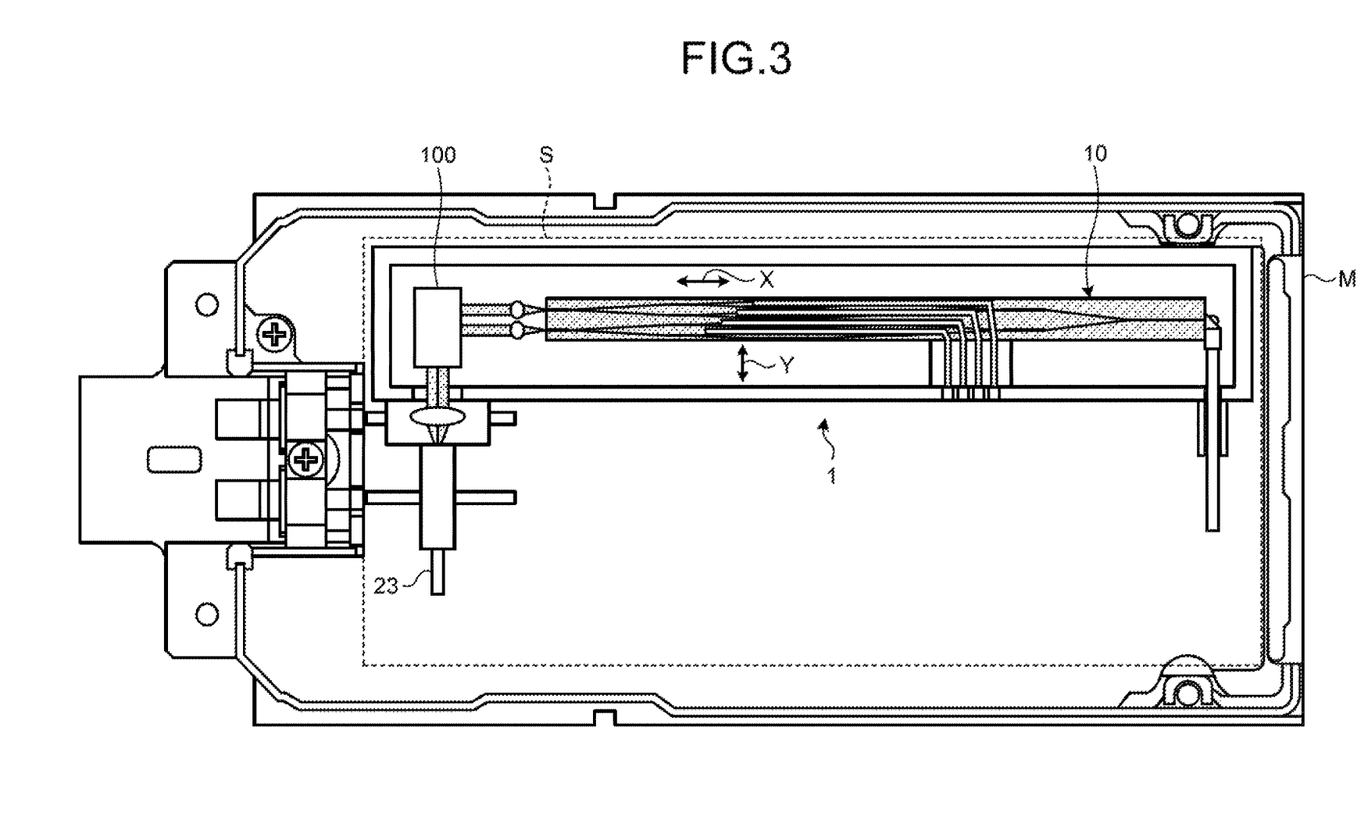
FIG. 3 is a diagram for explaining the housing state of the optical modulator according to the first embodiment housed in an optical transponder.

Subsequently, the housing state of the optical modulator 1 housed in an optical transponder M is explained with reference to FIG. 3. FIG. 3 is a diagram for explaining the housing state of the optical modulator according to the first embodiment housed in an optical transponder.

In the optical modulator 1 illustrated in FIG. 3, the polarized-light combiner 100 combines two optical beams output from the optical modulator chip 10 and outputs the combined optical beam to the optical fiber 23 placed along the direction Y without using a mirror, which is a separate member from the polarized-light combiner 100. That is, in a conventional optical modulator illustrated in FIG. 7, the mirror 700 is placed between the optical modulator chip 500 and the polarized-light combiner 600. Then, in the conventional optical modulator, two optical beams output from the optical modulator chip 500 are reflected in the direction of the short side of a substrate by the mirror 700, and then enter the polarized-light combiner 600. Then, the polarized-light combiner 600 combines the two optical beams reflected in the direction of the short side of the substrate by the mirror 700 into one optical beam, and outputs the obtained one optical beam to an optical fiber placed along the direction of the short side of the substrate. Therefore, in the conventional optical modulator, the number of parts increases because of the presence of the mirror 700, and the size of apparatus may increase. Consequently, there is a possibility that the optical modulator is not able to be housed in an internal space S of the optical transponder M.

In contrast, in the optical modulator 1 according to the present embodiment, the one polarized-light combiner 100 doubles as the function of combining two optical beams of which the polarization directions are perpendicular to each other and the function of outputting the combined optical beam to the optical fiber 23 placed along the direction of the short side of the substrate, i.e., the direction Y. Accordingly, a mirror for reflecting two optical beams output from the optical modulator chip 10 in the direction Y can be eliminated, and this avoids the increase in size of the optical modulator 1. As a result, the optical modulator 1 is housed in the internal space S of the optical transponder M as illustrated in FIG. 3.

As described above, according to the present embodiment, the polarized-light combiner 100 rotates the polarization direction of one of optical beams output from the optical modulator chip 10 and then combines the optical beam with the other optical beam, and outputs the obtained one optical beam to an optical fiber placed along the direction of the short side of the substrate. That is, the polarized-light combiner 100 rotates the polarization direction of one of optical beams output from the optical modulator chip 10 by means of the wave plate 210, and combines the optical beam with the two optical beams of which the polarization directions are perpendicular to each other by reflecting the two optical beams in the direction of the short side of the substrate by means of the PBC prism 220. Therefore, it is possible to make the one polarized-light combiner 100 double as the function of combining two optical beams of which the polarization directions are perpendicular to each other and the function of outputting the combined optical beam to the optical fiber placed along the direction of the short side of the substrate. Consequently, the miniaturization of apparatus can be promoted by reduction in the number of parts.

[b] Second Embodiment

A feature of a second embodiment is that a base member is bonded to an inclined surface of a first prism of a PBC prism, and a wave plate is fixed to the first prism and the base member, thereby increasing the fixation surface of the wave plate and fixing the wave plate securely.

A configuration of an optical modulator according to the second embodiment is the same as that of the optical modulator 1 according to the first embodiment, so description of the configuration of the optical modulator is omitted. In the second embodiment, a configuration of the polarized-light combiner 100 differs from the first embodiment.

Figure 4:
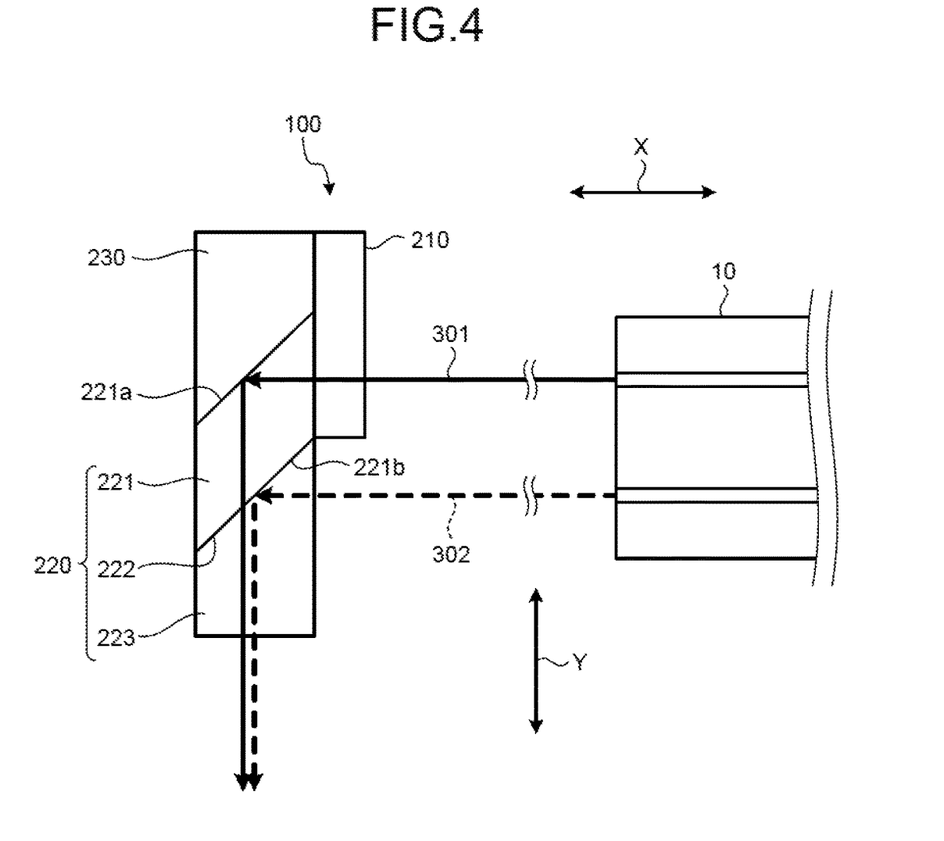
FIG. 4 is a top view illustrating a configuration of a polarized-light combiner according to a second embodiment.

FIG. 4 is a top view illustrating a configuration of a polarized-light combiner according to the second embodiment. In FIG. 4, the same component as that in FIG. 2 is assigned the same reference numeral, and description of the component is omitted. As illustrated in FIG. 4, a base member 230 is bonded to the inclined surface 221a of the first prism 221 of the PBC prism 220 through a total reflection coating. Then, the wave plate 210 is fixed to the first prism 221 and the base member 230.

In such a configuration, of two optical beams output from the optical modulator chip 10, the optical beam 301 passes through the wave plate 210 and then enters the PBC prism 220; the optical beam 302 directly enters the PBC prism 220 without passing through the wave plate 210. Then, the optical beam 301 having passed through the wave plate 210 is reflected in the direction Y by the total reflection coating on the inclined surface 221a of the first prism 221. Here, the polarization direction of the optical beam 301 is rotated by 90 degrees by the wave plate 210, so at the time when the optical beam 301 enters the PBC prism 220, the polarization direction of the optical beam 301 is perpendicular to that of the optical beam 302. Therefore, after the optical beam 301 is reflected in the direction Y by the total reflection coating on the inclined surface 221a of the first prism 221, the optical beam 301 runs through the polarized light separating film 222. On the other hand, after the optical beam 302 is reflected in the direction Y by the polarized light separating film 222, the optical beam 302 is combined with the optical beam 301 having run through the polarized light separating film 222. As a result, one optical beam obtained by combining the optical beams 301 and 302 of which the polarization directions are perpendicular to each other is output to the optical fiber 23 through the condenser lens 20.

As described above, according to the present embodiment, the polarized-light combiner 100 bonds the base member to the inclined surface of the first prism of the PBC prism, and fixes the wave plate to the first prism and the base member. Therefore, even if the size of the polarized-light combiner 100 is reduced with the miniaturization of apparatus, it is possible to increase the fixation surface of the wave plate and fix the wave plate securely.

[c] Third Embodiment

A feature of a third embodiment is that a wave plate is fixed to an inclined surface of a first prism of a PBC prism, thereby increasing the fixation surface of the wave plate and fixing the wave plate securely.

A configuration of an optical modulator according to the third embodiment is the same as that of the optical modulator 1 according to the first embodiment, so description of the configuration of the optical modulator is omitted. In the third embodiment, a configuration of the polarized-light combiner 100 differs from the first embodiment.

Figure 5:
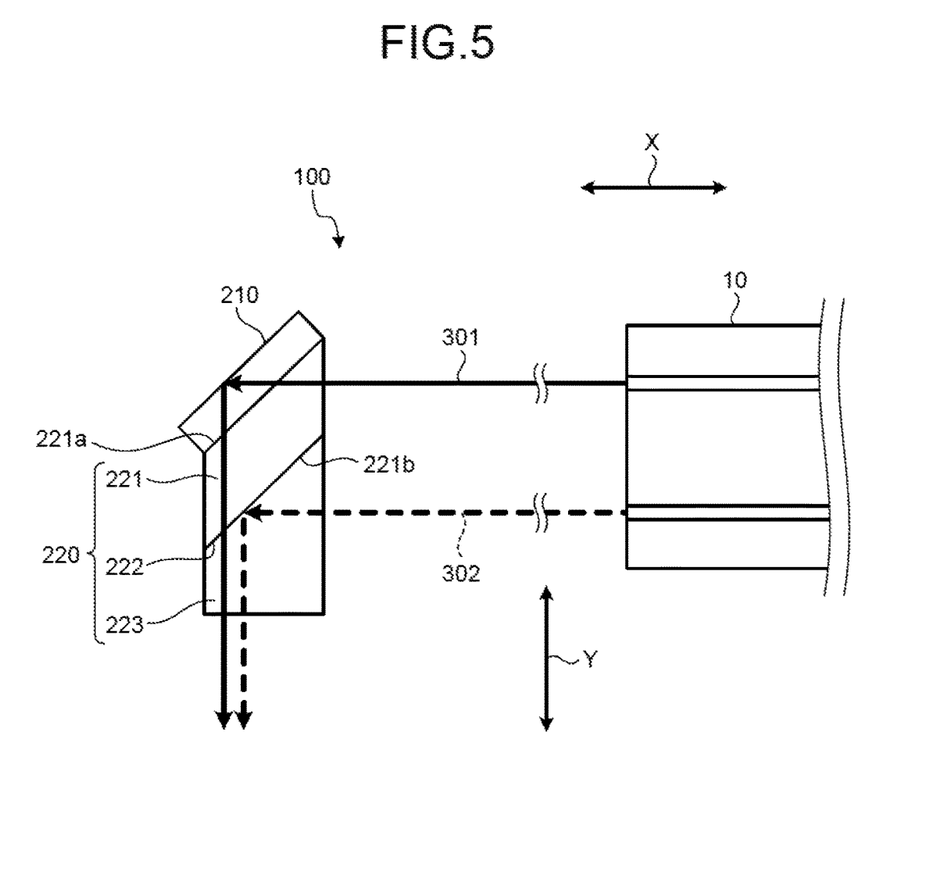
FIG. 5 is a top view illustrating a configuration of a polarized-light combiner according to a third embodiment.

FIG. 5 is a top view illustrating a configuration of a polarized-light combiner according to the third embodiment. In FIG. 5, the same component as that in FIG. 2 is assigned the same reference numeral, and description of the component is omitted. As illustrated in FIG. 5, the wave plate 210 is fixed to the inclined surface 221a of the first prism 221 of the PBC prism 220 through a non-reflection coating. The wave plate 210 rotates the polarization direction of an optical beam passing through the wave plate 210 by 90 degrees, and reflects the optical beam of which the polarization direction is rotated by the surface on the side opposite to the non-reflection coating on the inclined surface 221a of the first prism 221.

In such a configuration, the optical beams 301 and 302 output from the optical modulator chip 10 directly enter the PBC prism 220. Then, while passing through the wave plate 210, the optical beam 301 is reflected in the direction Y by the surface of the wave plate 210 on the side opposite to the non-reflection coating. Here, the polarization direction of the optical beam 301 is rotated by 90 degrees by the wave plate 210, so at the time when the optical beam 301 enters the polarized light separating film 222 of the PBC prism 220, the polarization direction of the optical beam 301 is perpendicular to that of the optical beam 302. Therefore, after the optical beam 301 is reflected in the direction Y by the surface of the wave plate 210 on the side opposite to the non-reflection coating, the optical beam 301 runs through the polarized light separating film 222. On the other hand, after the optical beam 302 is reflected in the direction Y by the polarized light separating film 222, the optical beam 302 is combined with the optical beam 301 having run through the polarized light separating film 222. As a result, one optical beam obtained by combining the optical beams 301 and 302 of which the polarization directions are perpendicular to each other is output to the optical fiber 23 through the condenser lens 20.

As described above, according to the present embodiment, the polarized-light combiner 100 fixes the wave plate to the inclined surface of the first prism of the PBC prism. Therefore, even if the size of the polarized-light combiner 100 is reduced with the miniaturization of apparatus, it is possible to increase the fixation surface of the wave plate and fix the wave plate securely.

[d] Fourth Embodiment

There are described above the embodiments of the optical modulator discussed in the present application; however, the technology discussed herein can be embodied in various different forms besides the above embodiments. A variation of the embodiments is described below as a fourth embodiment.

Figure 6:
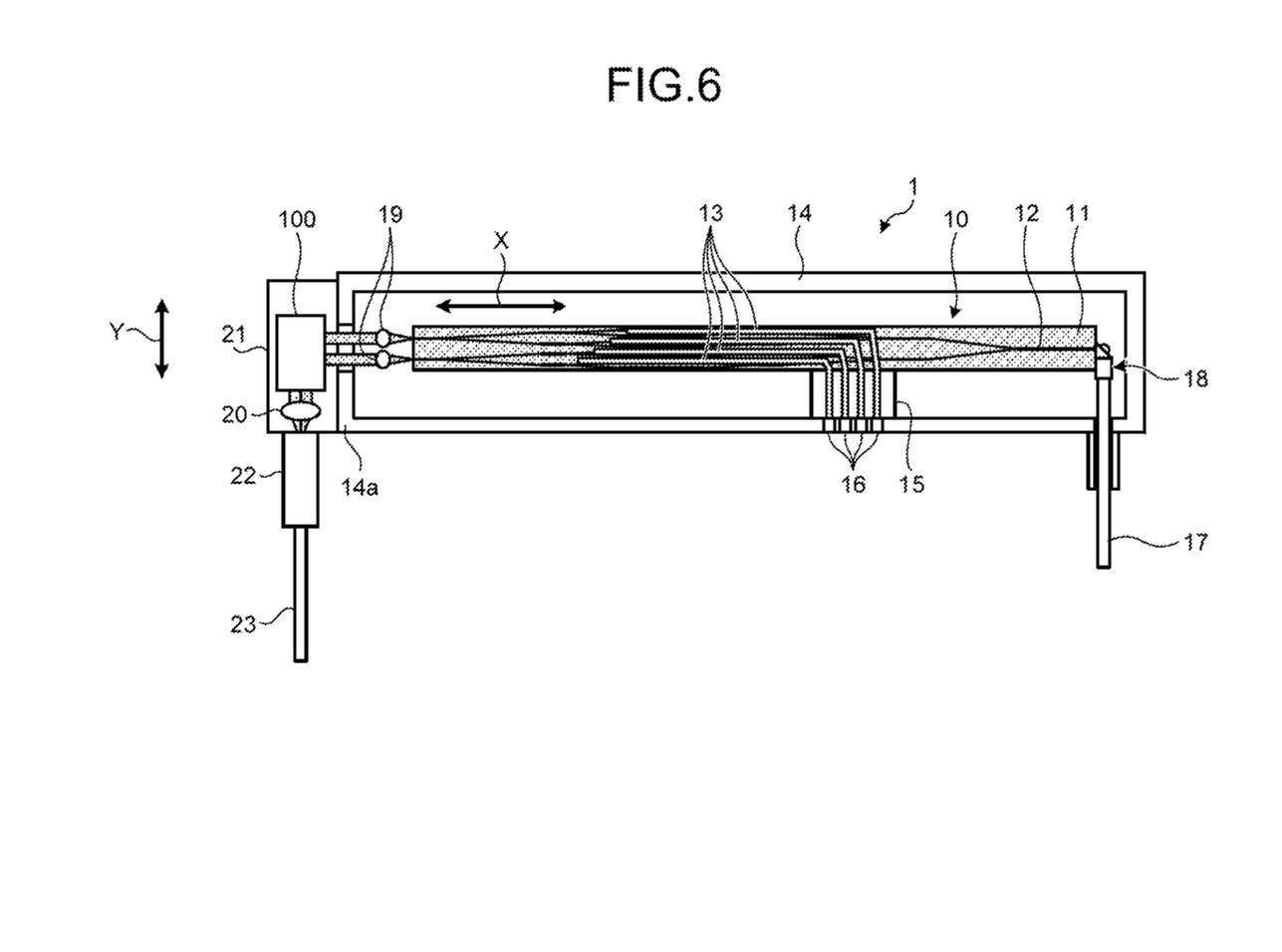
FIG. 6 is a top view illustrating a configuration of an optical modulator according to a variation of the embodiments.

In the first to third embodiments, there is described an example where the polarized-light combiner 100 is housed in the package 14; however, the technology discussed herein is not limited to this. FIG. 6 is a top view illustrating a configuration of an optical modulator according to the variation of the embodiments. For example, as illustrated in FIG. 6, the polarized-light combiner 100 can be housed in the lens holder 21 together with the condenser lens 20. In this case, the lens holder 21 is fixed to a side wall 14a of the package 14 located on the subsequent-stage side of the optical modulator chip 10, and the collimate lens 19 outputs two optical beams to the polarized-light combiner 100 through a window formed on the side wall 14a. This configuration enables the positions of the collimate lens 19 and the polarized-light combiner 100 to be easily adjusted by moving the lens holder 21 with respect to the side wall 14a of the package 14.

According to an aspect of an optical modulator discussed in the present application, it is possible to reduce the number of parts, thereby promoting the miniaturization of apparatus.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical modulator comprising:
a modulating unit that superimposes an electric signal on light, and outputs first and second optical beams with the electric signal superimposed thereon in a first direction;
an optical fiber that is placed along a second direction perpendicular to the first direction; and
a combining unit that combines the first and second optical beams output by the modulating unit and out- puts an optical beam obtained by the first and second optical beams being combined to the optical fiber, wherein the combining unit includes:

a polarized light rotating element that rotates a polarization direction of the first optical beam; and a polarized light combining element that has a first reflection surface and a second reflection surface, the first reflection surface reflecting the first optical beam of which the polarization direction has been rotated by the polarized light rotating element in the second direction, and the second reflection surface transmitting the first optical beam reflected in the second direction and reflecting the second optical beam of which a polarization direction has not been rotated in the second direction, and combines the first optical beam passing through the second reflection surface and second optical beam reflected on the second reflection surface.

2. The optical modulator according to claim 1, wherein the polarized light synthesizing element includes:

a first prism that has first and second inclined surfaces which are inclined with respect to the first direction, the polarized light rotating element being fixed to the first prism; and a second prism that is bonded to the first inclined surface of the first prism through a polarized light separating film, after the first optical beam of which the polarization direction has been rotated by the polarized light rotating element is reflected in the second direction by the second inclined surface, the first optical beam runs through the polarized light separating film, after the second optical beam is reflected in the second direction by the polarized light separating film, the second optical beam is combined with the first optical beam having run through the polarized-light separating film, the second inclined surface is the first reflection surface, and the first inclined surface and the polarized light separating film are the second reflection surface.

3. The optical modulator according to claim 2, wherein the polarized light synthesizing element further includes a base member that is bonded to the second inclined surface of the first prism through a total reflection coating, the polarized light rotating element is fixed to the first prism and the base member, after the first optical beam of which the polarization direction has been rotated by the polarized light rotating element is reflected in the second direction by the total reflection coating, the first optical beam runs through the polarized light separating film, after the second optical beam is reflected in the second direction by the polarized light separating film, the second optical beam is combined with the first optical beam having run through the polarized light separating film, the second inclined surface and the total reflection coating are the first reflection surface.

4. The optical modulator according to claim 1, wherein the polarized light synthesizing element includes:

a first prism that has first and second inclined surfaces that are inclined with respect to the first direction; and a second prism that is bonded to the first inclined surface of the first prism through a polarized light separating film, the polarized light rotating element is fixed to the second inclined surface of the first prism through a non-reflection coating, after the first optical beam of which the polarization direction has been rotated by the polarized light rotating element is reflected in the second direction by a surface of the polarized-light rotating element on the side opposite to the non-reflection coating, the first optical beam runs through the polarized light separating film, after the second optical beam is reflected in the second direction by the polarized light separating film, the second optical beam is combined with the first optical beam having run through the polarized light separating film, the second inclined surface is the first reflection surface, and the first inclined surface and the polarized light separating film are the second reflection surface.

* * * * *